US008216052B2

(12) United States Patent
Gagner et al.

(10) Patent No.: US 8,216,052 B2
(45) Date of Patent: Jul. 10, 2012

(54) SHARING GAME ASSETS IN A WAGERING GAME NETWORK

(75) Inventors: Mark B. Gagner, West Chicago, IL (US); John A. Beatty, Reno, NV (US)

(73) Assignee: WMS Gaming Inc., Waukegan, IL (US)

( * ) Notice: Subject to any disclaimer, the term of this patent is extended or adjusted under 35 U.S.C. 154(b) by 1176 days.

(21) Appl. No.: 11/996,238

(22) PCT Filed: Jul. 19, 2006

(86) PCT No.: PCT/US2006/027939
§ 371 (c)(1),
(2), (4) Date: Jan. 18, 2008

(87) PCT Pub. No.: WO2007/015887
PCT Pub. Date: Feb. 8, 2007

(65) Prior Publication Data

US 2008/0220841 A1 Sep. 11, 2008

Related U.S. Application Data

(60) Provisional application No. 60/700,933, filed on Jul. 20, 2005.

(51) Int. Cl.
*A63F 9/24* (2006.01)
*A63F 13/00* (2006.01)

(52) U.S. Cl. ................ 463/20; 463/16; 463/25; 463/29; 463/42

(58) Field of Classification Search .................... 463/16, 463/20, 25, 29, 42; 273/138.1, 138.2, 143 R
See application file for complete search history.

(56) References Cited

U.S. PATENT DOCUMENTS 5,766,076 A * 6/1998 Pease et al. .................... 463/27
5,997,401 A * 12/1999 Crawford ........................ 463/20
6,077,162 A 6/2000 Weiss
6,120,377 A * 9/2000 McGinnis et al. .............. 463/20
6,270,412 B1 * 8/2001 Crawford et al. ............... 463/20
6,375,568 B1 4/2002 Roffman et al.
6,508,707 B2 1/2003 DeMar et al.

(Continued)

FOREIGN PATENT DOCUMENTS

WO WO-2007011502 A1 1/2007

OTHER PUBLICATIONS

"Monopoly PC Manual", *Hasbro Games*, Artech Studio,(2002),1-31.
"International Search Report for Application No. PCT/US2006/27939, date mailed Dec. 15, 2006", 4 pgs.

(Continued)

*Primary Examiner* — Dmitry Suhol
*Assistant Examiner* — Ryan Hsu
(74) *Attorney, Agent, or Firm* — Schwegman, Lundberg & Woessner, P.A.

(57) ABSTRACT

Systems and methods for presenting streaming video content in a gaming machine are described herein. In one embodiment, the method includes acquiring, in a first gaming machine, access to a set of shared game assets. The method can also include providing a second gaming machine with access to the set of shared game assets. The method can also include conducting, in the first gaming machine, a first wagering game in which one of the set of shared game assets is consumed, and wherein during the first wagering game, the second gaming machine conducts a second wagering game in which another of the set of shared game assets is consumed.

20 Claims, 11 Drawing Sheets

U.S. PATENT DOCUMENTS

| | | | | |
|---|---|---|---|---|
| 6,786,824 | B2 | 9/2004 | Cannon | |
| 7,393,280 | B2 | 7/2008 | Cannon | |
| 7,666,088 | B2 | 2/2010 | Cannon | |
| 2004/0266534 | A1 * | 12/2004 | Byng | 463/42 |
| 2005/0014554 | A1 * | 1/2005 | Walker et al. | 463/20 |
| 2006/0009283 | A1 * | 1/2006 | Englman et al. | 463/29 |
| 2006/0116194 | A1 * | 6/2006 | Pacey et al. | 463/20 |
| 2006/0135243 | A1 * | 6/2006 | Englman et al. | 463/16 |
| 2007/0184896 | A1 | 8/2007 | Dickerson | |
| 2007/0218975 | A1 | 9/2007 | Iddings et al. | |

OTHER PUBLICATIONS

"Written Opinion of the International Searching Authority for Application No. PCT/US2006/27939, date mailed Dec. 15, 2006", 8 pgs.
"Australia Application Serial No. 2006276139, Examiner Report mailed Jul. 7, 2009", 2 pgs.
"Australian Application Serial No. 2010224364, Examiner Report mailed Feb. 23, 2011", 2 pgs.
"Australian Application Serial No. 2006276139, Office Action Mailed Jun. 3, 2009", 2 pgs.

* cited by examiner

SHARING GAME ASSETS IN A WAGERING GAME NETWORK

RELATED APPLICATIONS

This application is a U.S. National Stage Filing under 35 U.S.C. 371 from International Patent Application Serial No. PCT/US2006/027939, filed Jul. 19, 2006, and published on Feb. 8, 2007 as WO 2007/015887 A1, which claims the priority benefit of U.S. Provisional Application Ser. No. 60/700,933 filed Jul. 20, 2005, the content of which is incorporated herein by reference.

FIELD

This invention relates generally to the field of wagering game machines and more particularly to the field of sharing game assets in a wagering game network.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

Description of Related Art

Gaming machines, such as slot machines, video poker machines, and the like, have been a cornerstone of the gaming industry for many years. Generally, the popularity of such machines depends on the likelihood (or perceived likelihood) of players winning money and the intrinsic entertainment value of the games relative to other available gaming options. Because available gaming options include a number of competing gaming machines and because the expectation of winning is roughly the same (or believed to be the same) for each machine, players are most likely to gravitate toward the most entertaining and exciting gaming machines. Consequently, shrewd wagering game makers strive to offer entertaining and exciting gaming machines.

The rise of "bonus" games has successfully enhanced the entertainment value of wagering games. Bonus games are typically played in conjunction with "base" games (e.g., slots, poker, blackjack, etc.) and may comprise games different from their related base games. Bonus games typically begin when a selected event or outcome occurs in a base game. For example, a bonus game may begin after a gaming machine presents a certain combination of reel symbols in a slots game. Bonus games often produce significantly more player excitement than base games because they offer game assets and monetary awards. For example, in some bonus games, when players accumulate a certain number or combination of game assets, the players win monetary awards. However, many current basic and bonus games offer little incentive for players to return to play another time. Typically, once a player chooses to stop playing a game, the gaming machine returns the player's monetary credits, while discarding the player's game assets. As a result, should the player leave the game before accumulating enough game assets to win a monetary award, the player will lose his accumulated game assets. This can lead to player frustration and dissatisfaction.

BRIEF DESCRIPTION OF THE FIGURES

The present invention is illustrated by way of example and not limitation in the Figures of the accompanying drawings in which.

OVERVIEW OF SOME EMBODIMENTS

Figure 1:
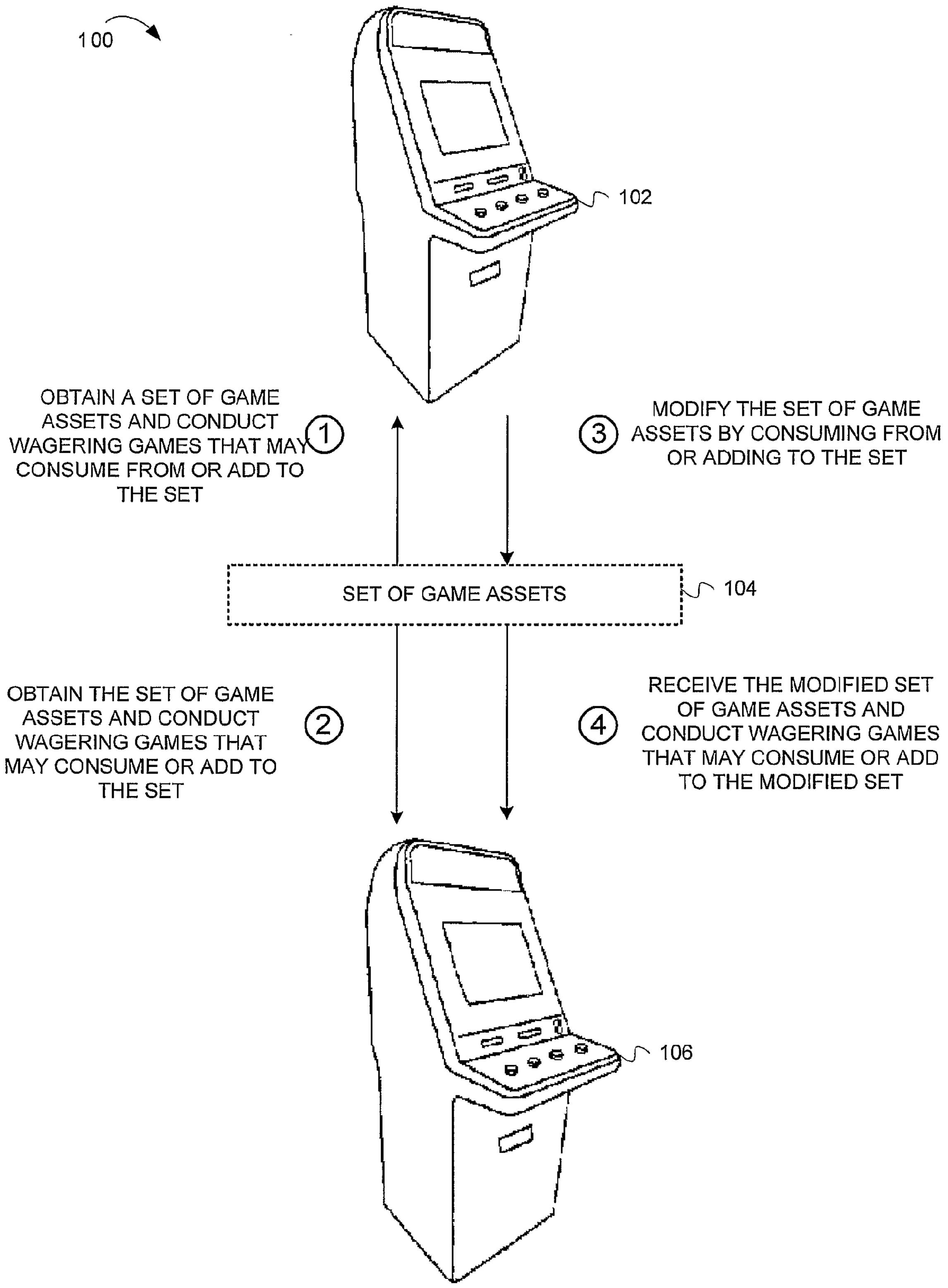
FIG. 1 is a dataflow diagram illustrating dataflow attendant to sharing game assets between gaming machines in a wagering game network.

Systems, methods, and machine-readable media including instructions for a master control program for a gaming device are described herein. In one embodiment, a method includes acquiring, in a first gaming machine, access to a set of shared game assets; providing a second gaming machine with access to the set of shared game assets; conducting, in the first gaming machine, a first wagering game in which one of the set of shared game assets is consumed, and wherein during the first wagering game, the second gaming machine conducts a second wagering game in which another of the set of shared game assets is consumed. In one embodiment, the one of game assets include a free spin, jackpot multiplier, or theme-specific game pieces. In one embodiment, the first and second wagering games include base games and bonus games.

In one embodiment, a method includes conducting a wagering game on a first wagering game machine, the conducting including, presenting an indication of a set of game assets available for consumption as part of the wagering game, wherein the game assets were awarded by a second wagering game machine, and wherein the set of game assets is also available for consumption as part of another wagering game on the second wagering game machine; and consuming one of the game assets during the wagering game. In one embodiment, the wagering game includes a base game and a bonus game, and wherein the game assets are consumed during the bonus game. In one embodiment, the one of game assets include a free spin, jackpot multiplier, or theme-specific game pieces. In one embodiment, the method further includes awarding monetary value based on game results arising from the consumption of the one of the game assets. In one embodiment, the wagering game is selected from the set consisting of slots, poker, blackjack, roulette, and craps.

In one embodiment, a machine-readable medium includes instructions which when executed by a first gaming machine cause the first gaming machine to perform operations comprising obtaining a set of game assets; conducting a first set of wagering games in a time period during which ones of the set of game assets are consumed by the first gaming machine; and receiving a modified set of game assets, wherein the modified set of game assets is formed based on the first gaming machine and a second gaming machine consuming certain of the set of game assets during the time period. In one embodiment, the operations further comprise after receiving the modified set of game assets, conducting a second set of wagering games in which ones of the modified set of game assets are available for consumption by the first and second gaming machines. In one embodiment, the first gaming machine and the second gaming machine are connected to a gaming network. In one embodiment, ones of the set of game assets include theme-specific game pieces, free spins, or jackpot multipliers. In one embodiment, the first and second sets of wagering games include base games and bonus games.

In one embodiment a method includes requesting a first set of shared game assets, wherein the first set is associated with a player identifier, and wherein the first set is shared by a plurality of gaming machines; receiving the first set of shared game assets; transmitting an indication that the first set of shared game assets has been modified; and receiving a second set of shared game assets, wherein the second set of shared game assets is shared by the plurality of gaming machines. In one embodiment, the first set is modified by consuming one of the first set during a wagering game. In one embodiment, ones of the first set of shared game assets include theme-specific game pieces, free spins, or jackpot multipliers. In one embodiment, the first and second sets are received from a gaming machine. In one embodiment, the wagering game is selected from the group consisting of slots, poker, roulette, blackjack, and craps.

In one embodiment, a machine-readable medium includes instructions which when executed by a first gaming machine cause the first gaming machine to perform operations comprising receiving a first set of shared game assets; receiving, from a second gaming machine, a request for the first set of shared game assets, the first set being shared by the first gaming machine and the second gaming machine; transmitting the first set of shared game assets to the second gaming machine; receiving, from the second gaming machine, an indication that one of the first set of shared game assets has been consumed during a first wagering game; and transmitting a modified set of shared gaming assets to the second gaming machine, wherein ones of the modified set are available for consumption by the first gaming machine and the second gaming machine. In one embodiment, the operations further comprise conducting, in the first gaming machine, a second wagering game during which one of the modified set is consumed, wherein at the same time, the second gaming machine is conducting a third wagering game during which another of the modified set is consumed. In one embodiment ones of the first and second sets of shared game assets include theme-specific game pieces, free spins, or jackpot multipliers. In one embodiment, the first and second sets of wagering games include base games and bonus games.

In one embodiment, a method includes receiving a termination from a first gaming machine of a set of gaming machines, the gaming machines of the set having access to a shared set of gaming assets; determining whether the first gaming machine has been tracking consumption of gaming assets of the shared set; and if the gaming machine has been tracking consumption of ones of the shared set, designating a second gaming machine of the set to track consumption of ones of the shared set of gaming assets. In one embodiment, the method further includes if the gaming machine has not been tracking consumption of ones of the shared set, indicating that the first gaming machine has terminated access to the shared set of gaming assets. In one embodiment, the shared set of game assets includes theme-specific game pieces, free spins, or jackpot multipliers.

In one embodiment, a method includes receiving a request for one of a set of gaming machines to consume one of a set of shared gaming assets; disabling consumption of the one of the set of shared gaming assets by others of the set of gaming machines; and granting permission to the one of the set of gaming machines to consume the one of the set. In one embodiment, the method further includes receiving an indication that the one of the set of shared gaming assets has been consumed by the one of the set of gaming machines; and revising the set of shared gaming assets to reflect consumption of the one of the shared set of gaming assets; and transmitting the revised set of shared gaming assets to ones of the set of gaming machines. In one embodiment, the shared set of game assets includes theme-specific game pieces, free spins, or jackpot multipliers.

DESCRIPTION OF THE EMBODIMENTS

Systems and methods for sharing game assets in a wagering game network are described herein. This description of the embodiments is divided into four sections. The first section provides an introduction to embodiments of the invention. The second section describes example gaming networks and gaming machines, while the third section describes example operations for sharing game assets in a wagering game network. The fourth section provides some general comments.

Introduction

This section introduces embodiments of a system for sharing game assets between gaming machines in a wagering game network. Embodiments of the invention allow players at multiple gaming machines to share and use a set of game assets at the same time. For example, if a set of assets includes a number of "free spins," players at different gaming machines can use the free spins in wagering games that are occurring at the same time. That is, one player can consume a free spin during a bonus game on one gaming machine, while another player has access to the remaining free spins in a bonus game on a second gaming machine. As players consume and acquire game assets, embodiments of the system update the set of game assets.

FIG. 1 is a dataflow diagram illustrating dataflow attendant to sharing game assets between gaming machines in a wagering game network. In FIG. 1, the system 100 includes gaming machines 102 and 106 communicatively coupled to a game asset store 104. The game assets store 104 can store a set of game assets, which is available for use by the gaming machines 102 and 106. FIG. 1 shows four stages of dataflow for sharing game assets between gaming machines.

At stage one, the gaming machine 102 obtains a set of game assets from the game asset store 104 and conducts wagering games that may consume from or add to the set. For example, the gaming machine 102 obtains the set of game assets, which includes game pieces for a theme-specific slots game. The gaming machine 102 then conducts slots games in which a player can consume (i.e., use) the game pieces for entertainment or monetary awards.

At stage two, the gaming machine 106 obtains the set of game assets and conducts wagering games that may consume from or add to the set. The gaming machines 102 and 106 may conduct the wagering games at the same time or the games may overlap in time (e.g., gaming machine 106 can conduct a bonus game while gaming machine 102 also conducts a bonus game, where the game assets are available in both bonus games).

At stage three, the gaming machine 102 transmits a modified set of game assets to the game asset store 104. For example, after a player uses a game asset, the gaming machine 102 modifies the set of game assets and transmits the modified set to the game asset store 104. All the while, the gaming machine 106 continues conducting wagering games that may consume from and add to the set.

At stage four, the gaming machine 106 receives the modified set of game assets and conducts wagering games that may consume from or add to the modified set. Because the gaming machine 106 has received the modified set, both gaming machines 102 and 106 can conduct wagering games that may consume from or add to the modified set.

While this section has provided an introduction to embodiments of the invention, the next section describes example gaming networks and gaming machines with which embodiments of the invention can be practiced.

Example Gaming Networks and Gaming Machine Architecture

This section provides example gaming networks in which embodiments of the invention can be practiced. This section also describes example gaming machines. Operations of gaming network components will be described in the next section.

Example Gaming Networks

Figure 2:
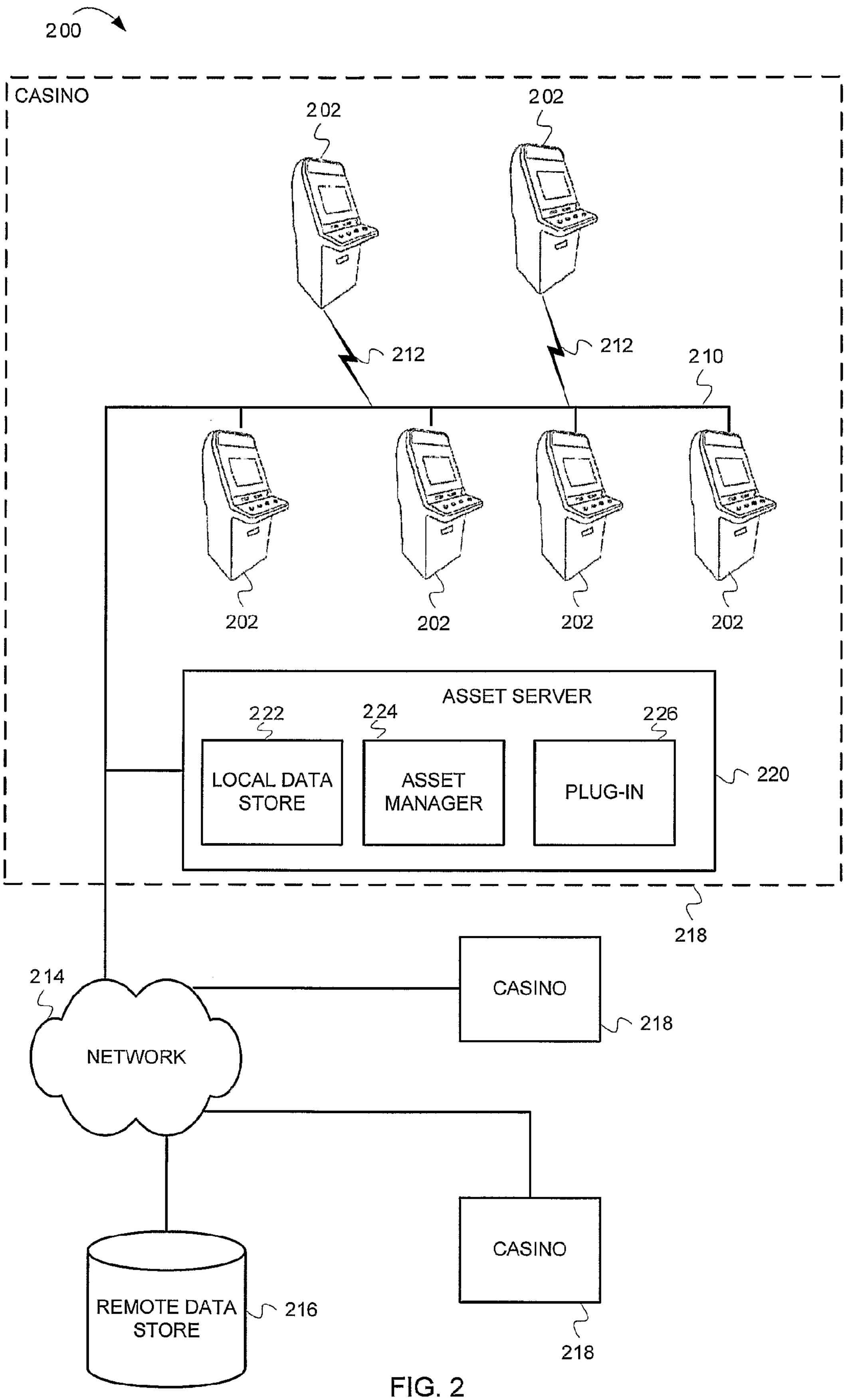
FIG. 2 is a block diagram of an wagering game network including an asset server for sharing game assets, according to example embodiments of the invention.

FIG. 2 is a block diagram of a wagering game network for sharing game assets, according to example embodiments of the invention. As shown in FIG. 2, the wagering game network 200 includes a plurality of casinos 218 connected to a communications network 214, which is connected to a remote data store 216.

Each of the plurality of casinos 218 can include local area networks, which include a plurality of gaming machines 202 connected to a game asset server 220. The game asset server 220 includes a local data store 222, session manager 324, and plug-in 226. In one embodiment, the asset server 220 and/or any of its components can include tangible machine-readable media including instructions for performing operations for sharing game assets in a game network, as described herein. Machine-readable media includes any mechanism that provides (i.e., stores and/or transmits) information in a form readable by a machine (e.g., a computer). For example, tangible machine-readable media includes semiconductor read only memory (ROM), semiconductor random access memory (RAM), magnetic disk storage media, optical storage media, flash memory devices, or any other suitable tangible media for providing instructions and/or data.

In one embodiment, the asset server's local data store 222 stores sets of game assets for use in wagering games conducted by the wagering game machines 202. In one embodiment, the local data store 222 includes a database for storing the sets of game assets. According to embodiments, the game assets can include theme-specific game pieces, free-spins, bonus multipliers, extra turns, and the like. In one embodiment, the game assets can include game pieces for a Monopoly®-style slots game. For example, the game assets can include Atlantic City properties, Chance cards, Community Chest cards, hotels, houses, etc.

In one embodiment, the asset server's asset manager 224 can include logic for consuming from or adding to sets of game assets and the plug-in 226 can include logic for processing game asset requests. In one embodiment, the plug-in 226 includes logic for translating game asset requests into a format processable by the local data store.

The components of each casino 218 can communicate over wired 210 and/or wireless connections 212. Furthermore, they can employ any suitable connection technology, such as Bluetooth, 802.11, Wireless Application Protocol (WAP), Ethernet, public switched telephone networks, etc.

Figure 3:
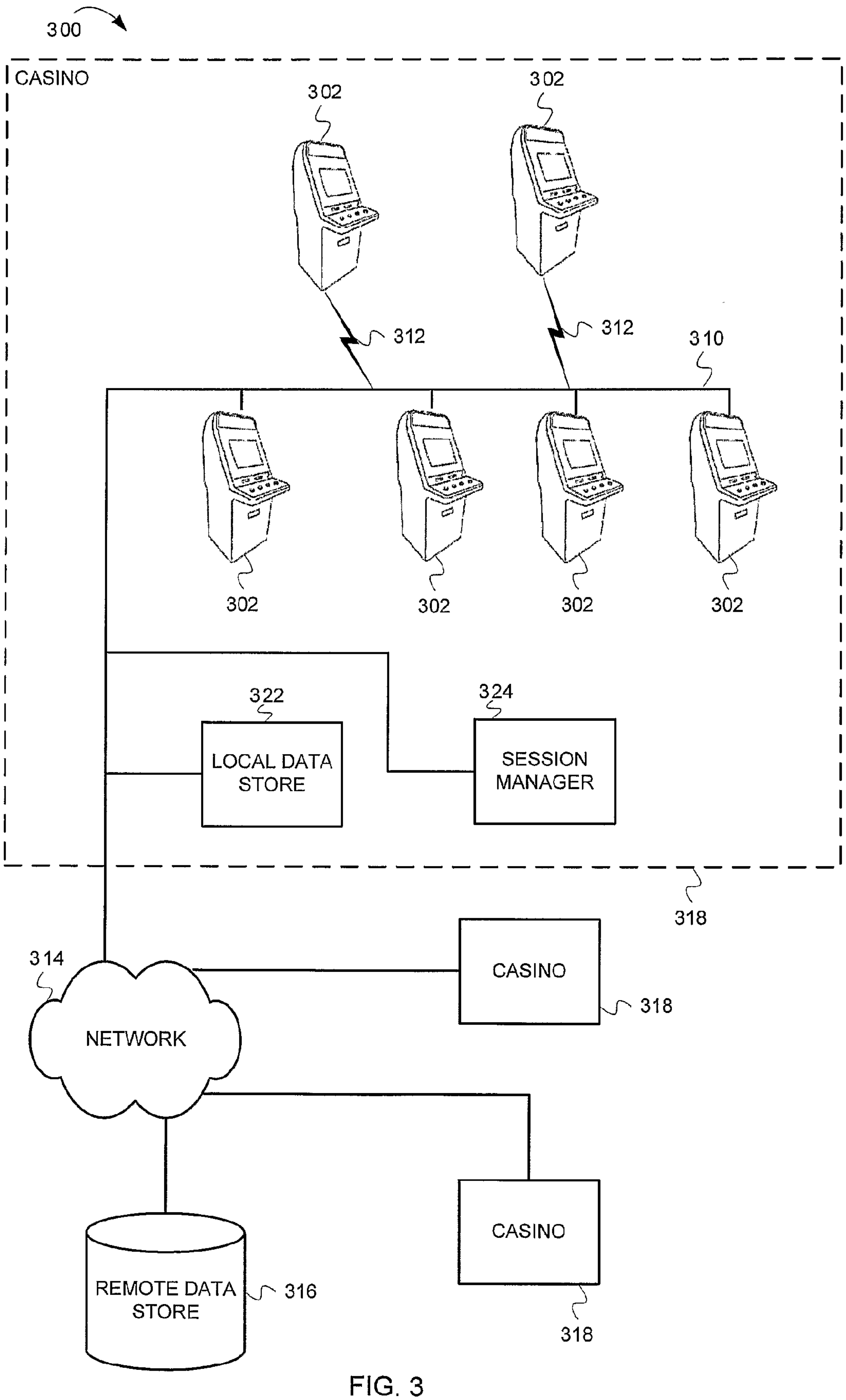
FIG. 3 is a block diagram of an wagering game network in which a gaming machine administers shared game assets, according to example embodiments of the invention.

FIG. 3 is a block diagram of a wagering game network in which gaming machines administer shared game assets, according to example embodiments of the invention. The network 300 is similar to the network shown in FIG. 2, except the casinos do not include asset servers. Instead, each casino 318 includes a local data store 322 and a session manager 324. In one embodiment, the local data store 322 includes a database for storing game assets. In one embodiment, the session manager 324 designates a "master gaming machine" for keeping track of shared game assets. Operations of these and other embodiments are described in greater detail below, in the next section. This description will continue with a discussion of FIGS. 4 and 5 in which gaming machines are described in more detail.

Example Gaming Machine Architecture

Figure 4:
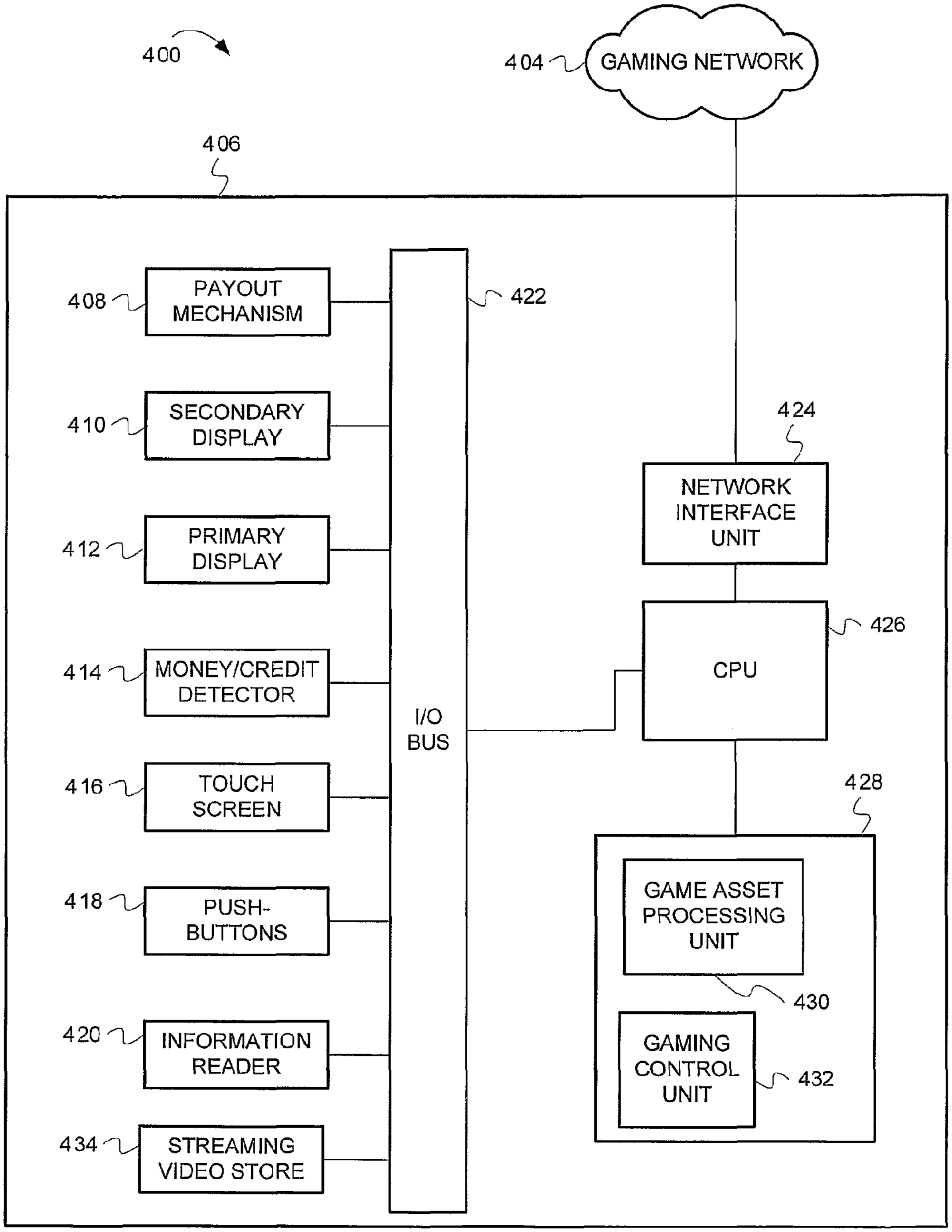
FIG. 4 is a block diagram illustrating components of a gaming machine, used in conjunction with example embodiments of the invention.

FIG. 4 is a block diagram illustrating components of a gaming machine, used in conjunction with example embodiments of the invention. As shown in FIG. 4, the gaming machine 406 includes a central processing unit (CPU) 426 connected to a memory unit 428, which includes an game asset processing unit 430 and a gaming control unit 432.

According to embodiments, the gaming control unit 432 can conduct any suitable casino-style wagering game (including bonus events), such as video poker, video black jack, video slots, etc. The gaming control unit 432 can also conduct bonus games associated with the base games. The gaming control unit 432 can include a random number generator or other logic for determining wagering game results.

The game asset processing unit 430 can work in conjunction with the gaming control unit 432 to process game asset requests. According to some embodiments, the game asset processing unit 430 and gaming control unit 432 can include tangible machine-readable media including instructions for conducting a basic wagering game, conducting a bonus game, presenting streaming video content, etc.

The CPU 426 is connected to a network interface unit 424, which is connected to a gaming network 404. The CPU 426 is also connected to an input/output (I/O) bus 422. The I/O bus 422 is connected to a streaming video store 434, which can be any suitable persistent storage device capable of storing streaming video segments. The streaming video store 434 can be a DVD drive, CD-ROM drive, hard disk drive, semiconductor memory device, etc.

The I/O bus 422 is also connected to payout mechanism 408, secondary display 410, primary display 412, money/credit detector 414, touchscreen 416, push-buttons 418, and information reader 420. The I/O bus 422 facilitates communication between the system components and the CPU 426.

According to some embodiments, the gaming machine 406 can include additional peripheral devices and/or more than one of each component shown in FIG. 4. For example, in one embodiment, the gaming machine 406 can include multiple network interface units 424 and multiple CPUs 426. Additionally, the components of the gaming machine 406 can be interconnected according to any suitable interconnection architecture (e.g., directly connected, hypercube, etc.). More details about gaming machines used in conjunction with embodiments of the invention are described below, in the discussion of FIG. 5.

Figure 5:
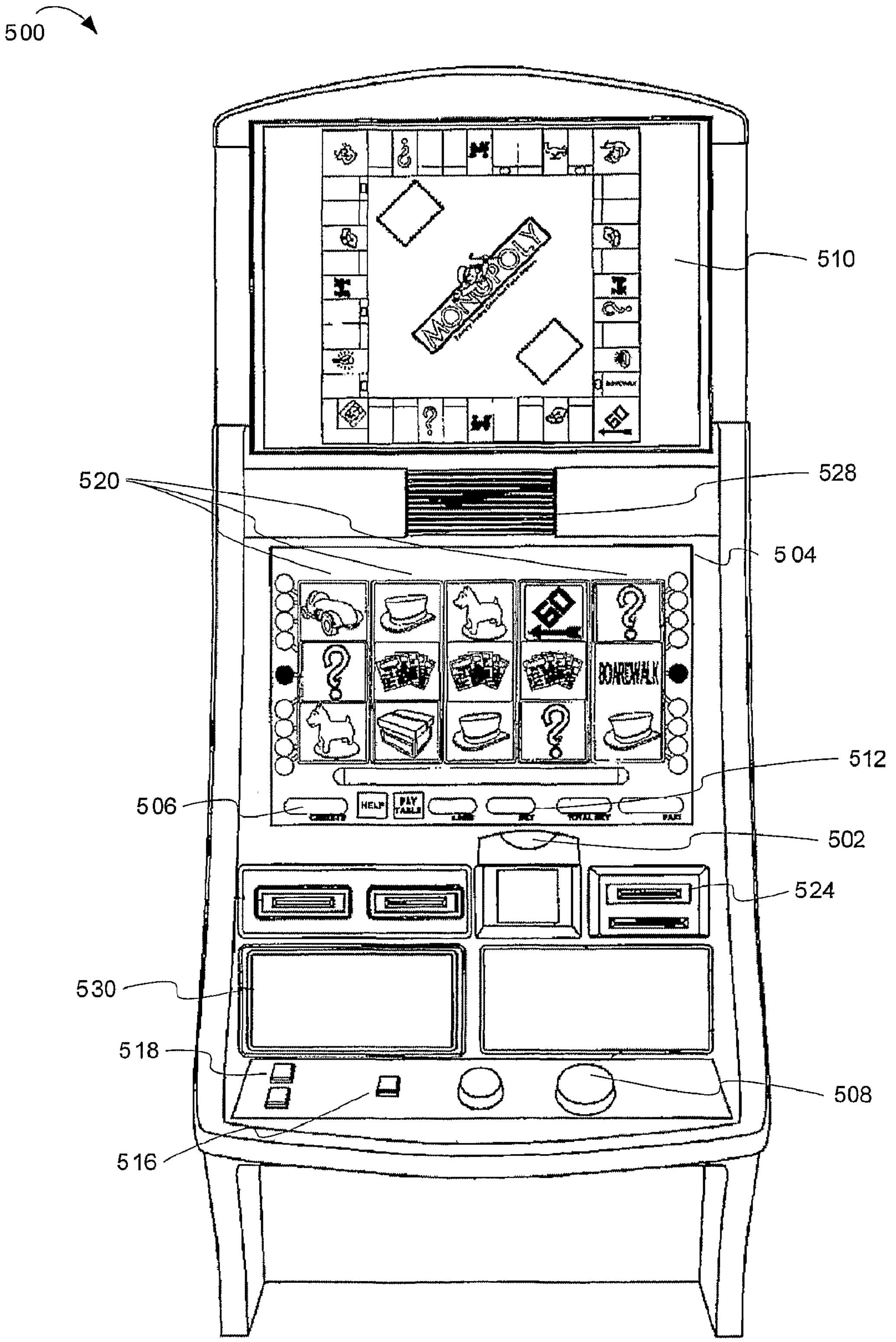
FIG. 5 is a perspective view of a gaming machine, according to example embodiments of the invention.

FIG. 5 is a perspective view of a gaming machine, according to example embodiments of the invention. As shown in FIG. 5, the gaming machine 500 can be a computerized slot machine having the controls, displays, and features of a conventional slot machine.

The gaming machine 500 can be operated while players are standing or seated. Additionally, the gaming machine 500 is preferably mounted on a stand (not shown). However, it should be appreciated that the gaming machine 500 can be constructed as a pub-style tabletop game (not shown), which a player can operate while sitting. Furthermore, the gaming machine 500 can be constructed with varying cabinet and display designs. The gaming machine 500 can incorporate any primary game such as slots, poker, or keno, and additional bonus round games. In one embodiment, the gaming machine 500 offers wagering games in which game assets can be awarded, consumed, and shared with other gaming machines of a gaming network. The symbols and indicia used on and in the gaming machine 500 can take mechanical, electrical, or video form.

As illustrated in FIG. 5, the gaming machine 500 includes a coin slot 502 and bill acceptor 524. Players can place coins in the coin slot 502 and paper money or ticket vouchers in the bill acceptor 524. Other devices can be used for accepting payment. For example, credit/debit card readers/validators can be used for accepting payment. Additionally, the gaming machine 500 can perform electronic funds transfers and financial transfers to procure monies from financial accounts. When a player inserts money in the gaming machine 500, a number of credits corresponding to the amount deposited are shown in a credit display 506. After depositing the appropriate amount of money, a player can begin playing the game by pushing play button 508. The play button 508 can be any play activator used for starting a wagering game or sequence of events in the gaming machine 500.

As shown in FIG. 5, the gaming machine 500 also includes a bet display 512 and a "bet one" button 516. The player places a bet by pushing the bet one button 516. The player can increase the bet by one credit each time the player pushes the bet one button 516. When the player pushes the bet one button 516, the number of credits shown in the credit display 506 decreases by one credit, while the number of credits shown in the bet display 512 increases by one credit.

A player may "cash-out" by pressing a cash-out button 518. When a player cashes out, the gaming machine 500 dispenses a voucher or currency corresponding to the number of remaining credits. The gaming machine 500 may employ other payout mechanisms such as credit slips (which are redeemable by a cashier) or electronically recordable cards (which track player credits), or electronic funds transfer.

The gaming machine also includes a primary display unit 504 and a secondary display unit 510 (also known as a "top box"). The gaming machine may also include an auxiliary video display 530. In one embodiment, the primary display unit 504 displays a plurality of video reels 520. According to embodiments of the invention, the display units 504 and 510 can include any visual representation or exhibition, including moving physical objects (e.g., mechanical reels and wheels), dynamic lighting, and video images. In one embodiment, each reel 520 includes a plurality of symbols such as bells, hearts, fruits, numbers, letters, bars or other images, which correspond to a theme associated with the gaming machine 500. The audio presentation unit 528 can include audio speakers or other suitable sound projection devices.

System Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., digital logic).

Figure 6:
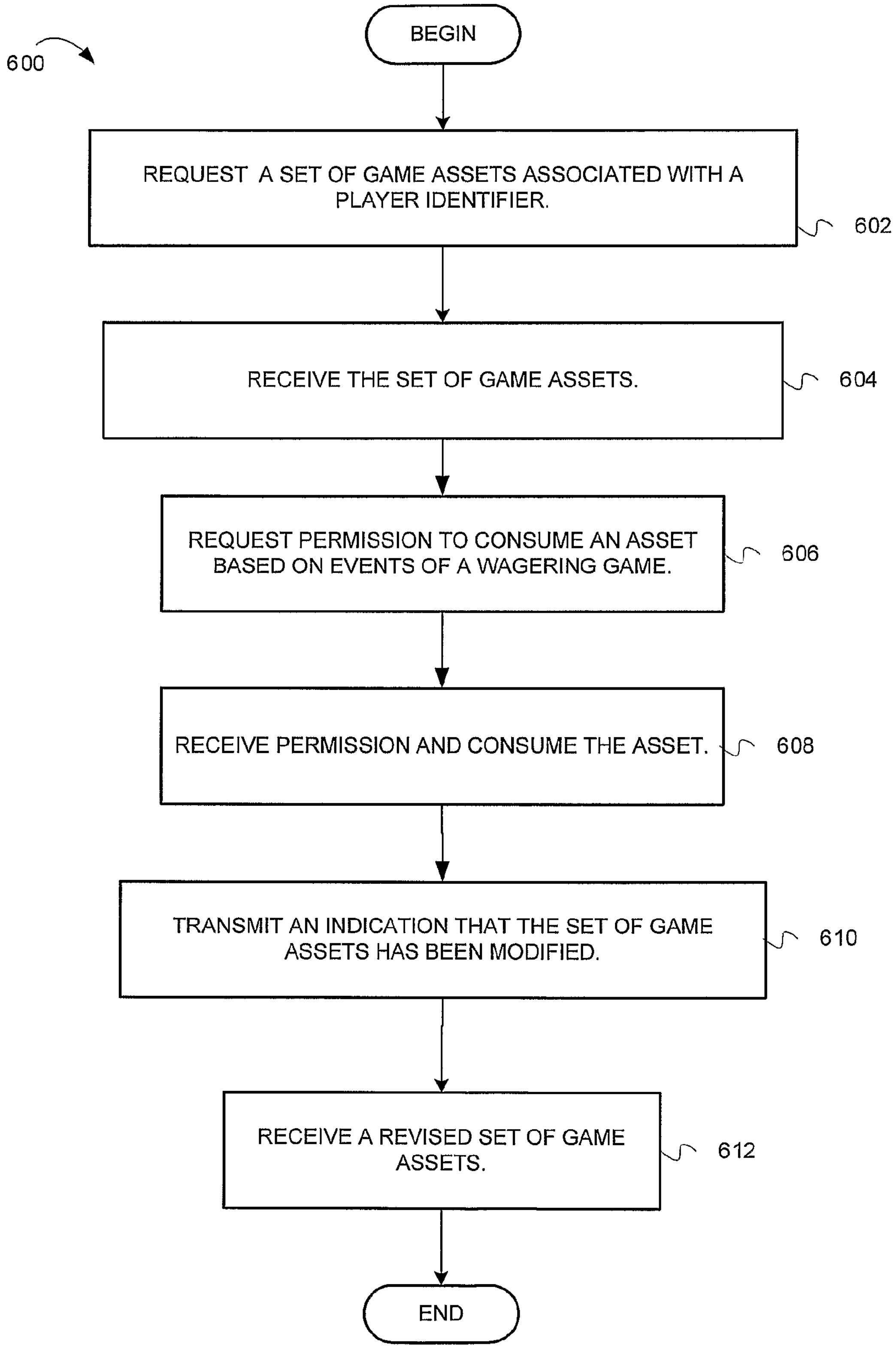
FIG. 6 is a flow diagram illustrating operations for consuming shared game assets in a gaming network, according to example embodiments of the invention.
Figure 7:
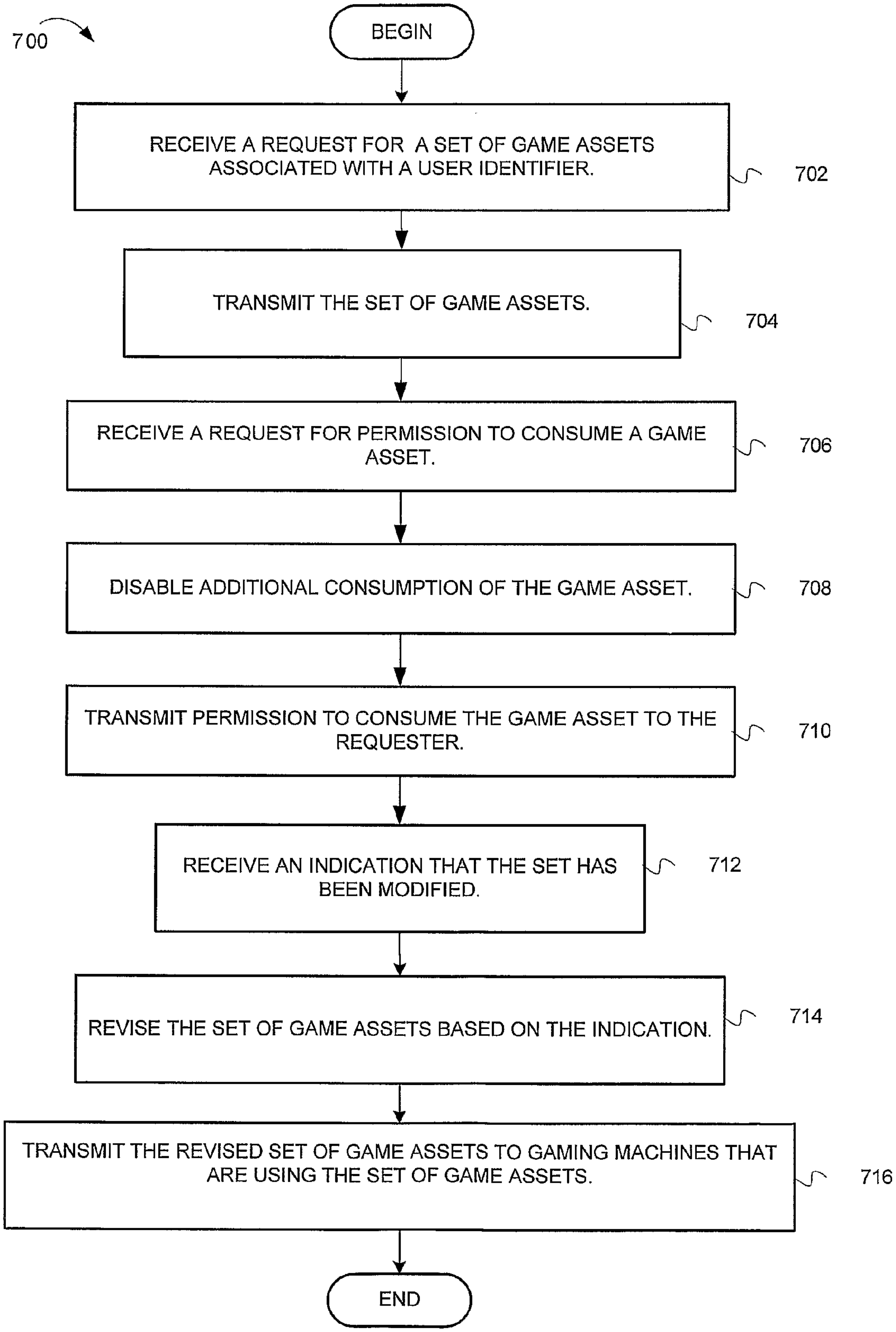
FIG. 7 is a flow diagram illustrating operations for processing requests for shared game assets, according to example embodiments of the invention.

FIGS. 6-12 are discussed below. FIGS. 6 and 7 describe embodiments in which an asset server processes requests to consume shared game assets, while FIGS. 8-12 describe embodiments in which a gaming machine processes game asset requests. This description will proceed with a discussion of FIG. 6.

FIG. 6 is a flow diagram illustrating operations for consuming shared game assets in a gaming network, according to example embodiments of the invention. The flow diagram 600 commences at block 602.

At block 602, a gaming machine 202 requests from the asset server 220 a set of game assets associated with a player identifier. In one embodiment, the gaming machine 202 commences a gaming session upon receiving a player tracking card including the player identifier. The gaming machine 202 then requests the set of game assets associated with the player identifier. In one embodiment, the set of game assets can include any suitable game element, such as theme-specific game pieces, free spins, bonus multipliers, and the like. The flow continues at block 604.

At block 604, the gaming machine 202 receives the set of game assets from the asset server 220. After receiving the set of game assets the gaming machine 202 can make the assets available for a player to use during a wagering game. The flow continues at block 606.

At block 606, the gaming machine 202 requests permission from the asset server 220 to consume one of the set of game assets based on events of a wagering game. For example, during a Monopoly®-style wagering game, the gaming machine 202 requests permission to consume a "Community Chest" card. The flow continues at block 608.

At block 608, the gaming machine 202 receives permission and consumes the game asset. For example, the gaming machine 202 receives permission and uses the "Community Chest" card during a bonus game. The flow continues at block 610.

At block 610, the gaming machine 202 transmits to the asset server 220 an indication that the set of game assets has been modified. In one embodiment, the indication includes information indicating that one of the set of game assets (e.g., the Community Chest card) has been consumed. The flow continues at block 612.

At block 612, the gaming machine 202 receives from the asset server 220 a revised set of game assets. In one embodiment, the revised set has one less theme-specific game piece as a result of the operations at block 608. From block 612, the flow 600 ends.

While FIG. 6 describes operations for consuming shared game assets, FIG. 7 shows operations for processing requests for shared game assets. In one embodiment, the operations shown in FIG. 7 are performed by the asset server 220. In other embodiments, other system components perform the operations.

FIG. 7 is a flow diagram illustrating operations for processing requests for shared game assets, according to example embodiments of the invention. The flow diagram 700 begins at block 702.

At block 702, the asset server 220 receives from a gaming machine 202 a request for a set of game assets associated with a player identifier. In one embodiment, game asset requests are formatted differently for each theme-specific game, as each theme calls for different game assets. For example, a Monopoly®-based game calls for different game assets than a Hollywood Squares® game. In one embodiment, each theme-specific game's assets can be represented by different database records.

In one embodiment, the plug-in 226 can interpret requests for a particular theme. The asset server 220 can include additional plug-ins to interpret requests for different themes. The requests for game assets can include XML documents describing the game assets, player identifier, and other information. In one embodiment, the plug-in 226 parses the XML document and translates the request into a format understandable by a database in the local data store 222. The flow continues at block 704.

At block 704, the asset server 220 transmits the set of game assets to the gaming machine 202. In one embodiment, the local data store 222 retrieves the set of game assets from its database and forwards the set to the gaming machine 202. The flow continues at block 706.

At block 706, the asset server 220 receives from the gaming machine 202 a request for permission to consume one of the set of game assets. For example, the gaming machine 202 requests permission to use a theme-specific game piece during a bonus game. In one embodiment, the asset manager 224 determines whether the requested game asset is available for consumption. The flow continues at block 708.

At block 708, the asset server 220 disables additional consumption of the game asset. In one embodiment, the operation at block 708 prevents multiple gaming machines from consuming the same shared game asset. In one embodiment, the operation is achieved by locks in the local data store's database. In another embodiment, the operation is achieved using by semaphores or other mutual exclusion data structures. The flow continues at block 710.

At block 710, the asset server 220 transmits to the gaming machine 202 permission to consume the game asset. The flow continues at block 712.

At block 712, the asset server 220 receives an indication that the gaming machine 202 has modified the set of game assets. For example, the indication indicates the gaming machine 202 consumed one of the set of game assets. After the game asset has been consumed, the database lock or semaphore can be released. The flow continues at block 714.

At block 714, the asset server 220 revises the set of game assets based on the indication. For example, the local data store 222 updates its database to reflect that the asset was consumed. The flow continues at block 716.

At block 716 the asset server 220 transmits a revised set of game assets to all gaming machines sharing the set of game assets. Because the set of game assets can be shared by a plurality of gaming machines 202, the asset server 220 can multicast the revised set to all that are sharing it. From block 716, the flow ends.

While FIGS. 6 and 7 describe embodiments in which an asset server processes game asset requests, FIGS. 8-11 describe embodiments that do not employ an asset server. Instead, FIGS. 8-11 describe embodiments in which one of the gaming machines processes game asset requests and manages sets of shared game assets. In an embodiment in which gaming machines process requests for shared game assets, the session manager 324 selects a "master" gaming machine to process game asset requests and track changes to shared game asset sets. This description will continue with a discussion of FIGS. 8 and 9, which describe operations for establishing and terminating a "master" gaming machine.

Figure 8:
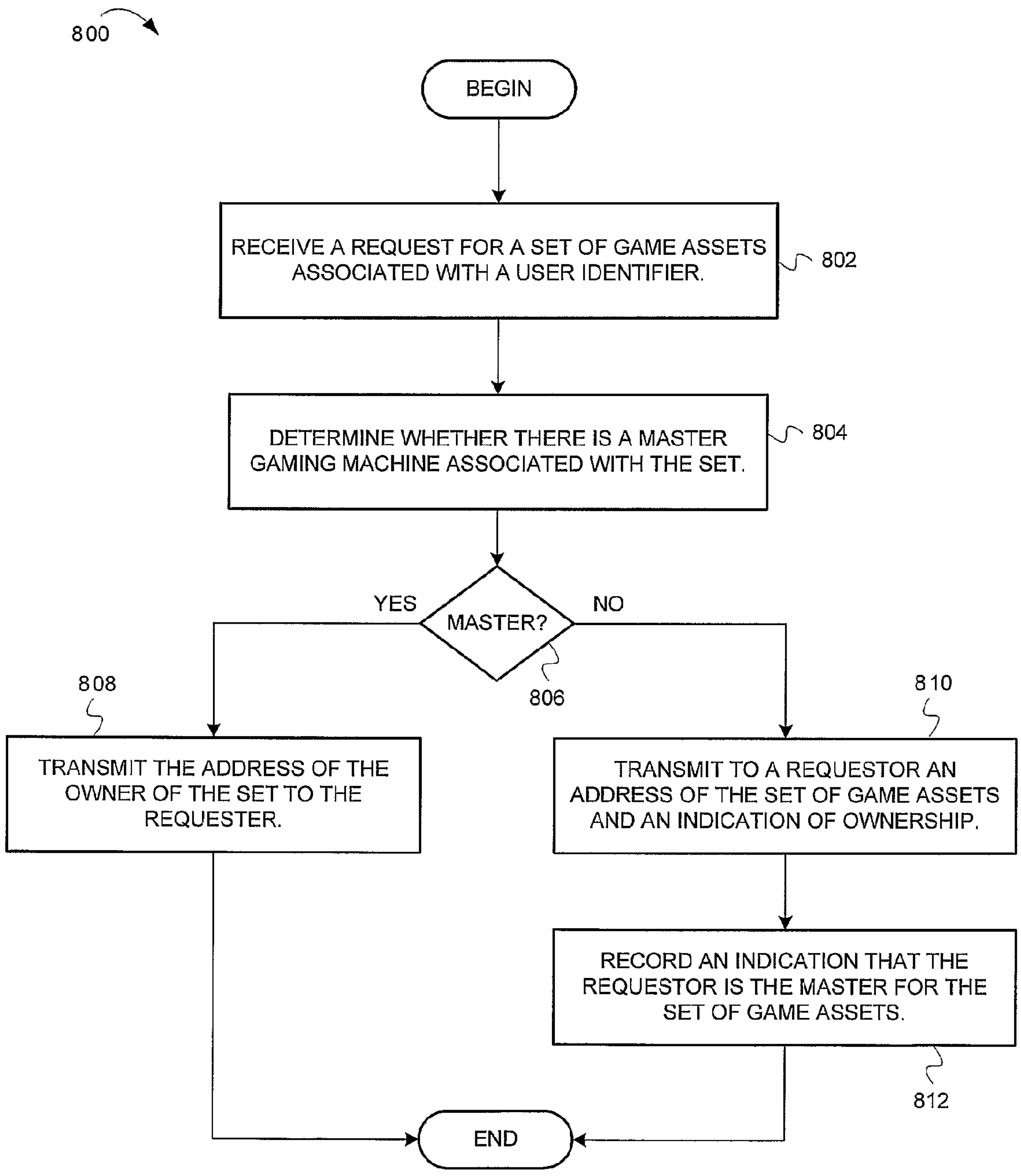
FIG. 8 is a flow diagram illustrating operations for establishing a master gaming machine for processing shared game asset requests, according to example embodiments of the invention.

FIG. 8 is a flow diagram illustrating operations for establishing a master gaming machine for processing shared game asset requests, according to example embodiments of the invention. The flow diagram 800 commences at block 802.

At block 802, the session manager 324 receives a request for a set of game assets associated with a player identifier. The flow continues at block 804.

At block 804, the session manager 324 determines whether there is a master gaming machine for the set. The flow continues at block 806. At block 806, if there is a master associated with the set, the flow continues at block 808. Otherwise, the flow continues at block 810.

At block 808, the session manager 324 transmits the address of the master gaming machine to the requester (i.e., another gaming machine). From block 808, the flow ends.

At block 810, the session manager 324 transmits to the requester an indication that the requester is the master gaming machine. Additionally, the session manager 324 transmits an address of the set of game assets. The flow continues at block 812.

At block 812, the session manager 324 records an indication that the requester (i.e., one of the gaming machines 302) is the master for the set of game assets. From block 812, the flow ends.

Figure 9:
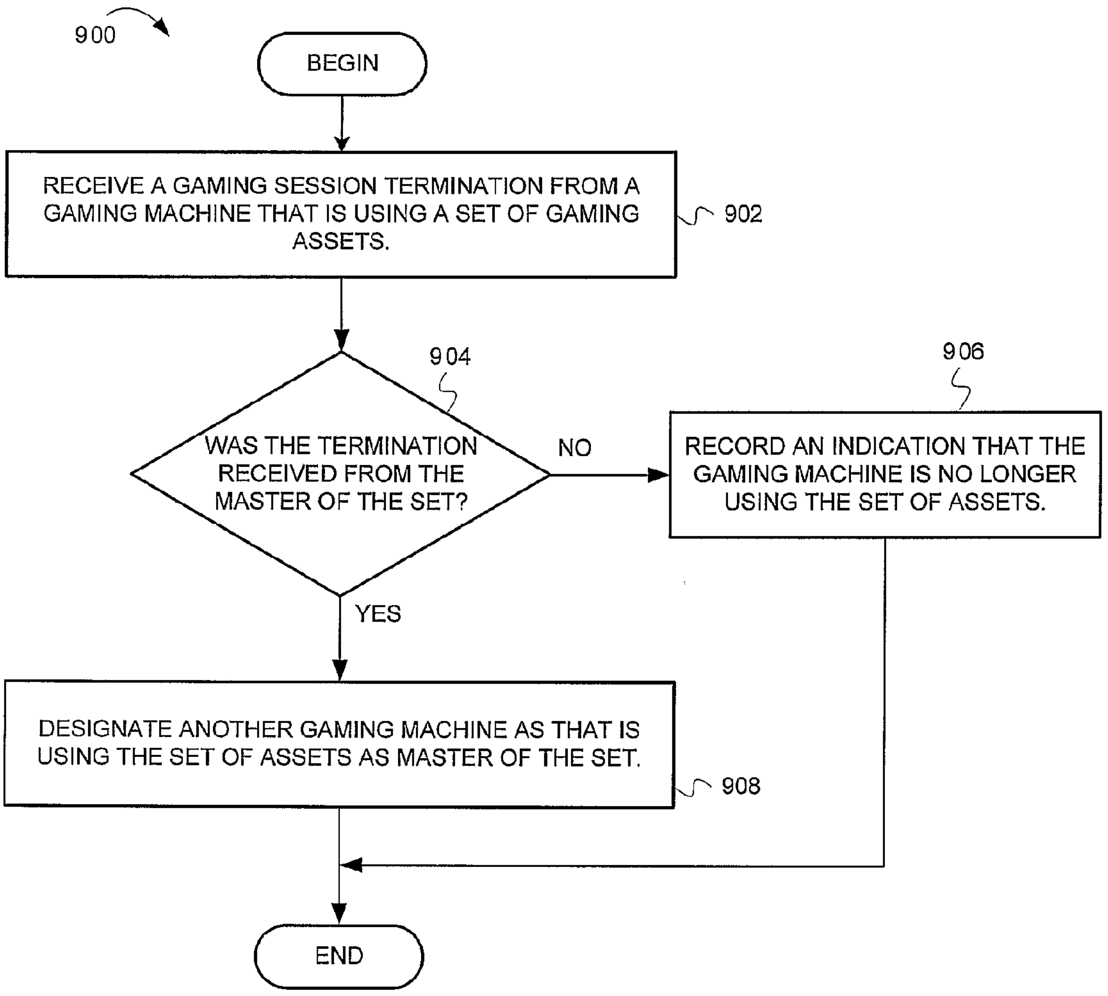
FIG. 9 is a flow diagram illustrating operations for terminating use of a set of gaming assets, according to example embodiments of the invention.

While FIG. 8 describes operations for establishing a master gaming machine for processing game asset requests, FIG. 9 describes operations for terminating a gaming machine's role as master.

FIG. 9 is a flow diagram illustrating operations for terminating use of a set of gaming assets, according to example embodiments of the invention. The flow diagram 900 commences at block 902.

At block 902, the session manager 324 receives a gaming session termination from a gaming machine that is using a set of gaming assets. In one embodiment, when a gaming machine detects removal of a player tracking card, the gaming machine transmits the termination. The flow continues at block 904.

At block 904, a determination is made about whether the termination was received from the owner of the set of gaming assets. If the termination was received from the set owner, the flow continues at block 908. Otherwise, the flow continues at block 906.

At block 906, the session manager records an indication that the gaming machine is no longer using the set of gaming assets. From block 906, the flow ends.

At block 908, the session manager 324 designates another gaming machine that is using the set to be master of the set. From block 908, the flow ends.

Figure 10:
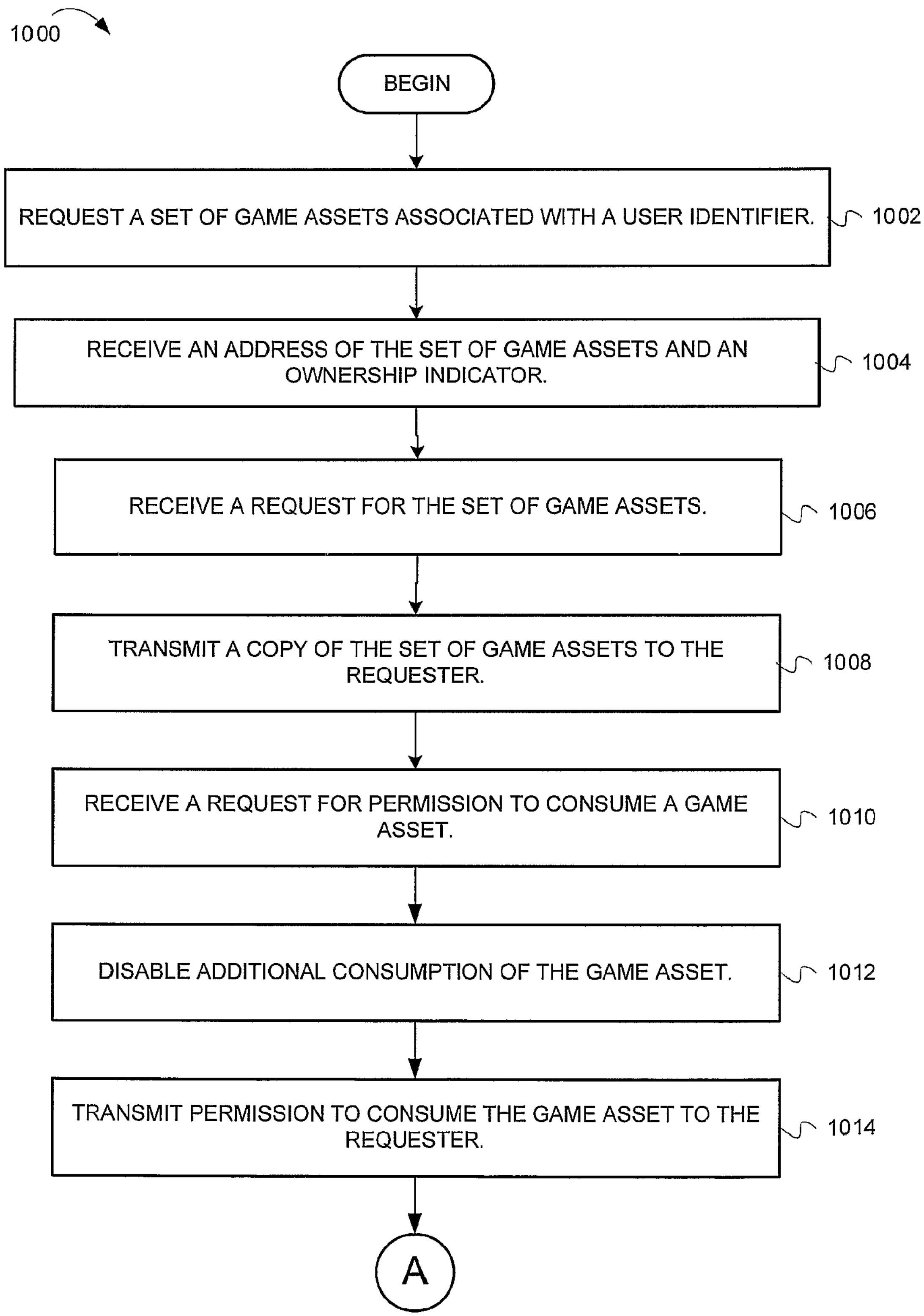
FIG. 10 is a flow diagram illustrating operations for processing shared game asset requests in a gaming machine, according to example embodiments of the invention.
Figure 11:
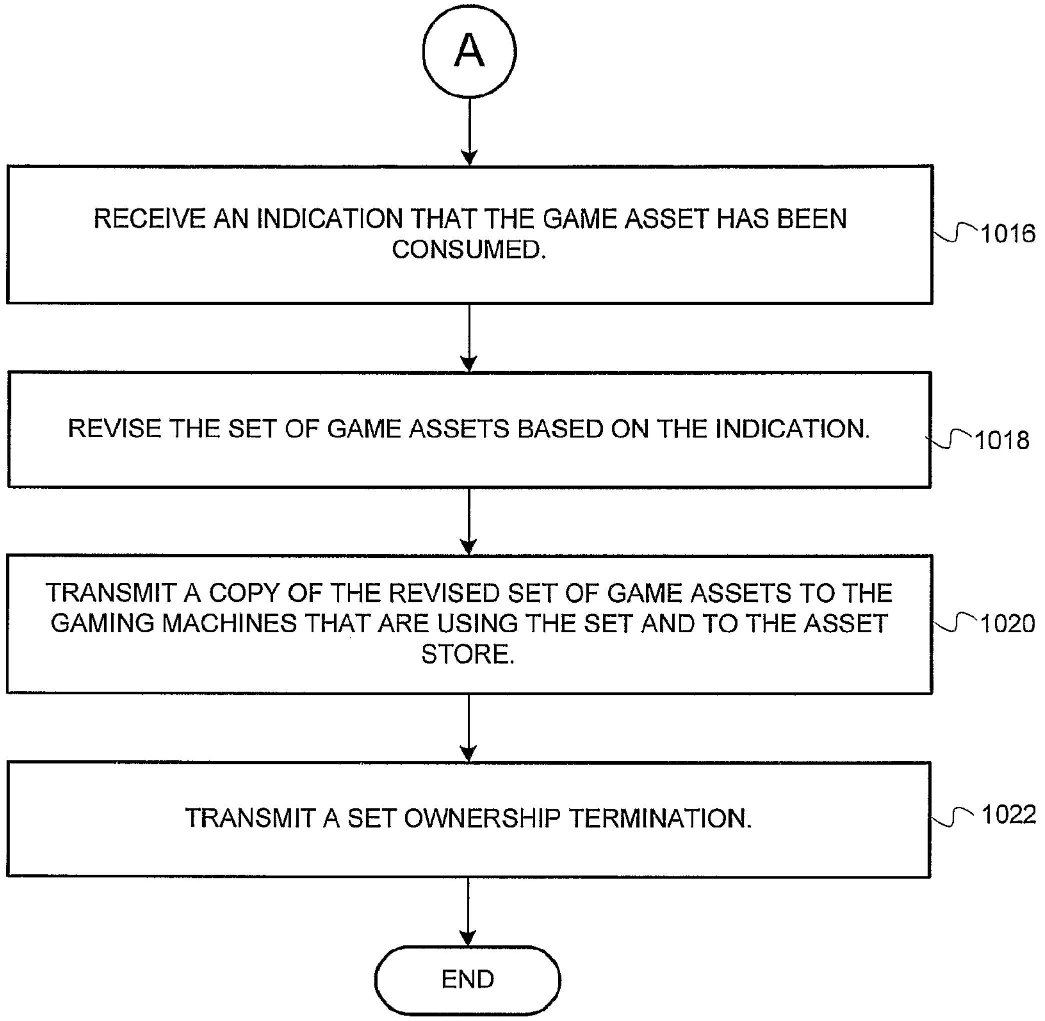
FIG. 11 is a block diagram illustrating additional operations for processing shared game asset requests in a gaming machine, according to example embodiments of the invention.

This description continues with a discussion of FIGS. 10 and 11, which describe operations performed by a "master" gaming machine.

FIG. 10 is a flow diagram illustrating operations for processing shared game asset requests in a gaming machine, according to example embodiments of the invention. The flow diagram 1000 commences at block 1002.

At block 1002, a gaming machine 302 requests from the session manager 324 a set of game assets associated with a player identifier. In one embodiment, after receiving a player tracking card, the gaming machine 302 requests the set of game assets associated with a player identifier stored on the player tracking card. The flow continues at block 1004.

At block 1004, the gaming machine 302 receives from the session manager 324 an address of the set of game assets and indication that it is to act as the master for the set. The flow continues at block 1006.

At block 1006, the master gaming machine 302 receives from another gaming machine a request for the set of game assets. In one embodiment, the another gaming machine is a slave gaming machine. The flow continues at block 1008.

At block 1008, the master gaming machine 302 transmits a copy of the set of game assets to the requester. The flow continues at block 1010.

At block 1010, the master gaming machine 302 receives from another gaming machine a request for permission to consume one of the set of game assets. The flow continues at block 1012.

At block 1012, the master gaming machine 302 disables additional consumption of the one of the set of game assets. In one embodiment, the master gaming machine 302 employs semaphores to disable additional consumption, whereas another embodiment employs locks in the local data store's database. The flow continues at block 1014.

At block 1014, the master gaming machine 302 transmits to the requester permission to consume the game asset. From block 1014, the flow continues at block 1016, which is shown in FIG. 11.

FIG. 11 is a block diagram illustrating additional operations for processing shared game asset requests in a gaming machine, according to example embodiments of the invention. The flow 1100 is a continuation of the flow 1000 shown in FIG. 10. The flow continues at block 1016.

At block 1016, the master gaming machine 302 receives an indication from the requester that the game asset has been consumed. The flow diagram continues at block 1018.

At block 1018, the master gaming machine 302 revises the set of game assets based on the indication. The flow continues at block 1020.

At block 1020, the master gaming machine 302 transmits a copy of the revised set of game assets to the gaming machines that are using the set. Additionally, the master gaming machine transmits a copy of the revised set to the local data store 322. The flow continues at block 1022.

At block 1022, the master gaming machine transmits to the session manager 324 a master termination indicator, indicating that it will no longer be the master associated with the set. From block 1022, the flow ends.

While FIGS. 10 and 11 describe operations for master gaming machines, non-master gaming machines perform operations similar to those discussed above with reference to FIG. 6. However, the non-master gaming machines communicate with a master gaming machine and the session manager 324 (see FIGS. 10 and 11) instead of communicating with the asset server 220.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A computer-implemented method of controlling the acquisition and consumption of shared game assets between wagering games, the method comprising:

receiving, via at least one first input device, a first player input to start a first game session on a first gaming machine, the first game session comprising one or more randomly generated first game outcomes, the first game session having access to a set of shared game assets stored on at least one memory device;

receiving, via at least one second input device, a second player input to start a second game session on a second gaming machine, the second game session being at least partly concurrent with the first game session, wherein any game outcome in the second game session is a second game outcome that is randomly generated independently of the first game outcomes, the second game session having access to the set of shared game assets stored on the at least one memory device;

acquiring a first game asset in the first game session, and adding the acquired first game asset to the set of shared game assets while the second game session is occurring such that both the first and second game sessions have access to the first game asset at the same time; and consuming the first game asset in the second game session.

2. The method of claim 1, wherein the set of shared game assets includes at least one of a free spin, a jackpot multiplier, and a theme-specific game piece.

3. The method of claim 1, wherein the first game asset is consumed in the second game session while the first game session is still ongoing.

4. The method of claim 1, wherein at least one of the first game session and the second game session includes a base game and a bonus game, and wherein at least one game asset from the set of shared game assets is consumed in the bonus game.

5. The method of claim 1, wherein consuming the first game asset results in an award having monetary value.

6. The method of claim 1, further comprising:

prior to consuming the first game asset, requesting permission, via an asset processing unit, to consume the first game asset in the second game session;

receiving the permission; and after consuming the first game asset, modifying, via the asset processing unit, the set of shared game assets to reflect the consumption of the first game asset.

7. The method of claim 6, wherein the permission is requested while the first game session is still ongoing.

8. The method of claim 6, wherein the permission is received while the first game session is still ongoing.

9. The method of claim 6, further comprising transmitting an indication, via the asset processing unit and to one or both of the first and second gaming machines, that the set of shared game assets has been modified.

10. The method of claim 6, wherein the first gaming machine is a master gaming machine, the master gaming machine processing game asset requests and tracking modifications to the set of shared game assets.

11. The method of claim 10, further comprising:

receiving a first game session termination request from the one of the first and second gaming machines;

determining if the termination request originates from the master gaming machine;

in response to the termination request originating from the master gaming machine, designating the second gaming machine as the master gaming machine.

12. A gaming system controlling the acquisition and consumption of shared game assets during gaming sessions occurring on multiple gaming machines, the system comprising:

at least first and second gaming machines configured to conduct wagering games independently of each other;

one or more processors that process game asset requests and track game assets in a set of shared game assets;

at least one memory device storing instructions that, when executed by the one or more processors, cause the one or more processors to operate with the first gaming machine and second gaming machine to receive a request from the first gaming machine for access to the set of shared game assets, the first gaming machine conducting a first game session comprising one or more randomly generated first game outcomes;

receive a request from the second gaming machine for access to the set of shared game assets, the second gaming machine conducting a second game session that is at least partly concurrent with the first game session, wherein any game outcome in the second game session is a second game outcome that is randomly generated independently of the first game outcomes;

in response to a first game asset being acquired in the first game session, add the first game asset to the set of shared game assets while the second game session is occurring such that the first and second game sessions simultaneously have access to the first game asset;

receive a request from the second gaming machine to consume the first game asset in the second game session;

grant the request to consume the first game asset; and modify the set of shared game assets to reflect the consumption of the first game asset.

13. The gaming system of claim 12, wherein one of the first and second gaming machines is designated as a master gaming machine, the master gaming machine comprising the one or more processors and processing game asset requests and tracking modifications to the set of shared game assets.

14. The gaming system of claim 12, wherein the one or more processors are connected for communication to the first and second gaming machines via a communications network.

15. The gaming system of claim 14, wherein the set of shared game assets is stored on an asset server connected to the communications network.

16. The gaming system of claim 12, further comprising, in response to the request to consume an asset, disabling consumption of the requested asset to prevent more than one consumption of the requested asset.

17. A machine-readable, non-transitory medium storing executable instructions that, when executed by one or more processors, cause the one or more processors to perform the method comprising:

receiving, via at least one input device, a first player input to start a first game session on a first gaming machine, the first game session comprising one or more randomly generated first game outcomes, and the first game session having access to a set of shared game assets stored on at least one memory device;

receiving, via at least one second input device, a second player input to start a second game session on a second gaming machine, the second game session having access to the set of shared game assets at least partly concurrently with the first game session, wherein any game outcome in the second game session is a second game outcome that is randomly generated independently of the first game outcomes;

acquiring a first game asset, in the first game session, and adding the acquired first game asset to the set of shared game assets such that the first and second game sessions gain access to the first game asset at the same time; and consuming the first game asset, in the second game session and while the first game session is still ongoing.

18. The machine-readable medium of claim 17, further comprising, prior to consuming the first game asset:

requesting permission, while the first game session is still ongoing, to consume the first game asset in the second game session; and receiving the permission.

19. The machine-readable medium of claim 17, further comprising, prior to consuming the first game asset:

requesting permission to consume the first game asset in the second game session; and receiving the permission while the first game session is still ongoing.

20. The machine-readable medium of claim 18, wherein the medium resides on an asset server on a communications network.

* * * * *

UNITED STATES PATENT AND TRADEMARK OFFICE

CERTIFICATE OF CORRECTION

PATENT NO. : 8,216,052 B2
APPLICATION NO. : 11/996238
DATED : July 10, 2012
INVENTOR(S) : Gagner et al.

It is certified that error appears in the above-identified patent and that said Letters Patent is hereby corrected as shown below:

On the face page, in column 2, under "Other Publication", line 1, delete "Studio,(2002),1-31" and insert --Studio, (2002), 1-31--, therefor On the face page, in column 2, under "Other Publication", line 3, before "mailed", delete "date", therefor On page 2, in column 2, under "Other Publication", line 2, before "mailed", delete "date", therefor On page 2, in column 2, under "Other Publication", line 8, delete "Mailed" and insert --mailed--, therefor In column 13, line 53, in Claim 12, after "to", insert --:--, therefor Signed and Sealed this
Fourth Day of December, 2012

David J. Kappos
*Director of the United States Patent and Trademark Office*